United States Patent
Ishino et al.

(10) Patent No.: US 9,529,187 B2
(45) Date of Patent: Dec. 27, 2016

(54) REFLECTIVE DISPLAY DEVICE

(71) Applicant: Panasonic Corporation, Osaka (JP)

(72) Inventors: Masato Ishino, Osaka (JP); Atsushi Omote, Osaka (JP); Takayuki Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 340 days.

(21) Appl. No.: 14/474,286

(22) Filed: Sep. 1, 2014

(65) Prior Publication Data

US 2015/0070748 A1   Mar. 12, 2015

(30) Foreign Application Priority Data

Sep. 9, 2013 (JP) .................. 2013-186483
Sep. 27, 2013 (JP) ................. 2013-201838

(51) Int. Cl.
  *G02B 26/00* (2006.01)
(52) U.S. Cl.
  CPC .................. *G02B 26/005* (2013.01)
(58) Field of Classification Search
  CPC .................. G02B 26/00; G02B 26/005
  USPC ..... 349/38–40; 359/237–240, 242, 245–246, 359/250–252, 265–271, 290–298
  See application file for complete search history.

(56) References Cited

U.S. PATENT DOCUMENTS

| | | |
|---|---|---|
| 7,420,549 B2 | 9/2008 | Jacobson et al. |
| 7,436,576 B2 | 10/2008 | Clarke et al. |
| 7,463,398 B2 | 12/2008 | Feenstra et al. |
| 7,529,012 B2 | 5/2009 | Hayes et al. |
| 7,548,363 B2 | 6/2009 | Hayes et al. |
| 8,154,485 B2 | 4/2012 | Clarke et al. |
| 2004/0058450 A1 | 3/2004 | Pamula et al. |
| 2011/0002035 A1 | 1/2011 | Okamoto |
| 2013/0128337 A1 | 5/2013 | Takahashi et al. |

(Continued)

FOREIGN PATENT DOCUMENTS

| | | |
|---|---|---|
| JP | 2008-503785 | 2/2008 |
| JP | 4559274 | 10/2010 |

(Continued)

OTHER PUBLICATIONS

Robert A. Hayes et.al "Video-speed electronic paper based on electrowetting" Nature vol. 425. Sep. 25, 2003 pp. 383-385.

(Continued)

*Primary Examiner* — Bumsuk Won
*Assistant Examiner* — Tamara Y Washington
(74) *Attorney, Agent, or Firm* — McDermott Will & Emery LLP (57) ABSTRACT

The reflective display device includes: a cell having: a display surface; a rear surface; side surfaces; and an interior space; a partition in a shape having radial extension dividing the rear surface into N regions; N rear electrodes respectively provided for the N regions on the rear surface; first side electrodes disposed on a display surface side and second side electrodes disposed on a rear surface side; N display-side electrodes separated by a separator zone in a shape having radial extension; a dielectric layer covering the N rear electrodes; polar liquid portions of N colors respectively disposed in N portions in the interior space; and polarity fluid placed within the interior space. A center of the partition matches with a center of the separator zone. A direction of the radial extension of the partition is different from that of the separator zone.

5 Claims, 9 Drawing Sheets

(56) References Cited

U.S. PATENT DOCUMENTS

2013/0222880 A1    8/2013   Nakasuga et al.

FOREIGN PATENT DOCUMENTS

| JP | 4588491 | 12/2010 |
|----|---------|---------|
| JP | 4594378 | 12/2010 |
| JP | 4610561 | 1/2011 |
| JP | 2011-065182 | 3/2011 |
| JP | 4653398 | 3/2011 |
| JP | 4672005 | 4/2011 |
| JP | 4712030 | 6/2011 |
| WO | 2005/096066 | 10/2005 |
| WO | 2012/039471 | 3/2012 |

OTHER PUBLICATIONS

Karlheinz Blankenbach et.al "Bistable Electrowetting Displays with Superior Optical Performance" Proceedings of the International Symposium on Electronic Paper pp. 1-6.

REFLECTIVE DISPLAY DEVICE

BACKGROUND

1. Field of the Invention

The present disclosure relates to a reflective display device.

2. Description of the Related Art

In recent years, reflective display devices using electrowetting have been gaining attention as a reflective display device for electronic paper.

For example, "Nature" 425, 383-385 (2003) discloses a reflective display device in which colored non-polar liquid (color oil) and transparent and colorless polar liquid (water) are filled within a cell having, on a bottom surface of the cell, a white substrate, transparent electrodes disposed on the white substrate, and an insulating film having a water-repellent front surface and disposed on the transparent electrode. When no voltage is applied, the color oil spreads over an entire surface of the water repellent film and a color of the oil is displayed. When a voltage is applied between the electrodes and the polar liquid, a contact angle of water with the water repellent film is reduced, and a front surface of the water repellent film apparently becomes hydrophilic. This causes a white color of the substrate to be displayed as the water spreads over the bottom surface and the color oil moves to corners. In this manner, displayed colors may be switched by applying a voltage, and high reflectance and contrast may be achieved in a monochrome operation.

Unfortunately, in color display, as it is usually required to use color filters, a loss increases, and, a reflective area for each color decreases in inverse proportion to a number of colors as the different colors are arranged in parallel. Therefore, reflectance and contrast in a polychrome operation are reduced to a large extent as the number of colors increases. In addition, with such a configuration, it is usually difficult to perform a bistable operation required for passive matrix driving.

Unexamined. Japanese Patent Publication No. 2011-65182 discloses a reflective display device having a color shifting pixel configuration and capable of performing a bistable operation. This reflective display device includes an equilateral triangular display surface having triangular sub-pixels of four colors of red (R), green (G), blue (B), and black (K), and K is disposed in center, and R, G, and B are arranged around K. Each sub-pixel is provided with a separate electrode, and an entire pixel is covered by an insulating film having a water repellent surface. The entire pixel is provided with transparent polar water and non-polar black oil. When no voltage is applied, the non-polar black oil spreads over the entire pixel to display black. When a voltage is applied to the R, G, and B sub-pixels, it is possible to achieve display of white (actually, gray). When a voltage is applied to the electrodes at a peripheral portion, R, G, and B are achieved as the colors of the pixel to which the voltage is applied. Further, when a voltage is applied to two of the electrodes excluding one for black, colors of cyan (C), magenta (M), and yellow (Y) are displayed.

Unexamined Japanese Patent Publication No. 2011-65182 also discloses a reflective display device that realizes a bistable operation allowing passive matrix driving. This structure includes a lower substrate, an electrode disposed on the lower substrate, a dielectric layer disposed over the electrode, an upper substrate, a transparent electrode disposed on the upper substrate, and a dielectric layer disposed over the transparent electrode. The upper substrate and the lower substrate are disposed such that the dielectric layers of the both substrates face toward each other, and colored oil and an aqueous layer that is colored by a different color are disposed between the two substrates. When no voltage is applied, the reflective display device displays the color of the aqueous layer. When a voltage is applied between the electrode of the lower substrate and the aqueous layer, the oil turns into small droplets due to charge formation between the aqueous layer and the oil, and makes the dielectric layer of a front surface wet as a driving voltage is cancelled. This achieves a second stable state. Unexamined. Japanese Patent Publication No. 2011-65182 discloses that the electrode disposed on the upper substrate may be disposed on a side wall.

Further, international Publication No. WO2012/039471 discloses a reflective display device capable of performing color display with high contrast. This reflective display device is provided, with a cell configured by a pair of substrates, and layers made of a hydrophilic material are respectively provided for upper and lower surfaces within the cell. Hydrophobic liquid is filled within the cell.

In "Proceedings of the International Symposium on Electronic Paper", pp 1-6 (2012), a reflective display device capable of performing a bistable operation and having a different structure is disclosed. This reflective display device includes electrodes at a display position as a pixel, and a standby position of droplets, and realizes the bistable operation of moving polar droplets among non-polar droplets by switching the electrodes to which a voltage is applied.

SUMMARY

One non-limiting and exemplary embodiment of the present disclosure provides a reflective display device capable of performing color display with higher reflectance than that in a conventional configuration.

A reflective display device according to one exemplary embodiment disclosed in the present disclosure includes: a cell having: a display surface; a rear surface facing the display surface; side surfaces positioned between the display surface and the rear surface; and an interior space defined by the display surface, the rear surface, and the side surfaces; a partition in contact with the rear surface and the side surfaces, the partition having height smaller than a gap between the display surface and the rear surface and being in a shape having radial extension dividing the rear surface into N regions; N rear electrodes respectively provided for the N regions on the rear surface; first side electrodes disposed on a display surface side and second side electrodes disposed on a rear surface side, each of the first side electrodes and each of the second side electrodes are provided for each of N regions of the side surfaces respectively adjacent to the N regions of the rear surface; N display-side electrodes transparent to visible light, the display-side electrodes being disposed on the display surface and separated by a separator zone in a shape having radial extension; a dielectric layer covering the N rear electrodes, the N display-side electrodes, and the first side electrodes and the second side electrodes in the N regions of the side surfaces; polar liquid portions of N colors respectively disposed in N portions in the interior space divided by the partition; and polarity fluid placed within the interior space. When viewed from the display surface side, a center of the partition in the shape having the radial extension and a center of the separator zone in the shape having the radial extension match with each other, and a direction of the radial extension of the partition is different from a direction of the radial extension of the separator zone.

According to the reflective display device disclosed in the present disclosure, it is possible to realize a reflective display device capable of performing color display with high reflectance in one pixel.

DETAILED DESCRIPTION OF THE EMBODIMENTS

Close examination by the inventor of the present disclosure shows that a reflective display device capable of performing conventional color display is able to display eight colors by changing a portion of four sub-pixels to which a voltage is to be applied. However, when R, G, and B are displayed, a reflective area for each color is only 25% at a maximum.

On the other hand, when C, M, and Y are displayed based on two types of additive color mixing, a reflective area for each color is 50% at a maximum, and when white is displayed based on RGB additive color mixing, a reflective area is 75% at a maximum. However, as the color mixing is performed based on a lateral arrangement, these colors have broad spectra and are grayish and dull. Therefore, a color reproduction range in a color solid scale including brightness is very small.

Further, there is a case in which a reflective display device capable of performing the conventional color display is not able to sufficiently realize a bistable operation.

In view of the above conventional problems, the inventor of the present disclosure inventor has conceived of a reflective display device capable of performing color display with higher reflectance than that in a conventional configuration. Outlines of a reflective display device according to exemplary embodiments disclosed in the present disclosure are as follow.

A reflective display device according to one exemplary embodiment disclosed in the present disclosure includes: a cell having: a display surface; a rear surface facing the display surface; side surfaces positioned between the display surface and the rear surface; and an interior space defined by the display surface, the rear surface, and the side surfaces; a partition in contact with the rear surface and the side surfaces, the partition having height smaller than a gap between the display surface and the rear surface and being in a shape having radial extension dividing the rear surface into N regions; N rear electrodes respectively provided for the N regions on the rear surface; first side electrodes disposed on a display surface side and second side electrodes disposed on a rear surface side, each of the first side electrodes and each of the second side electrodes are provided for each of N regions of the side surfaces respectively adjacent to the N regions of the rear surface; N display-side electrodes transparent to visible light, the display-side electrodes being disposed on the display surface and separated by a separator zone in a shape having radial extension; a dielectric layer covering the N rear electrodes, the N display-side electrodes, and the first side electrodes and the second side electrodes in the N regions of the side surfaces; polar liquid portions of N colors respectively disposed in N portions in the interior space divided by the partition; and polarity fluid placed within the interior space. When viewed from the display surface side, a center of the partition in the shape having the radial extension and a center of the separator zone in the shape having the radial extension match with each other, and a direction of the radial extension of the partition is different from a direction of the radial extension of the separator zone.

When viewed along a direction perpendicular to the display surface, the partition may be rotated by 180°/N with respect to the separator zone.

The N may be 4 or 8.

On a front surface of the dielectric layer, regions around the rear electrodes and around the display-side electrodes may have higher wetting properties as compared to other regions.

A front surface of each of the display-side electrodes may he provided with bumps of a size of not less than 1 μm and not more than 20 μm.

Hereinafter, exemplary embodiments according to the present invention will be described with reference to the drawings.

First Exemplary Embodiment

Figure 1:
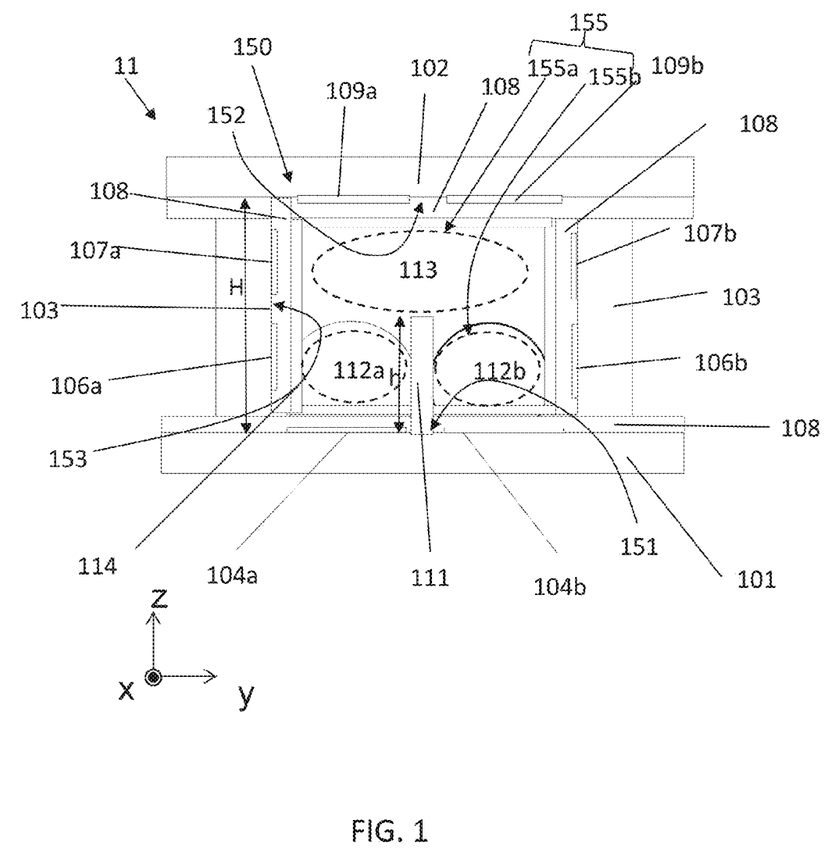
FIG. 1 shows a cross-section structure of a reflective display device according to a first exemplary embodiment.

FIG. 1 schematically shows a cross-section of a reflective display device according to one exemplary embodiment. Reflective display device 11 in this exemplary embodiment is provided with cell. 150. Cell 150 is a display unit that constitutes 1 pixel. Cell 150 includes display surface 152, rear surface 151 facing display surface 152, side surfaces 153 positioned between display surface 152 and rear surface 151, and interior space 155 defined by display surface 152, rear surface 151, and side surfaces 153.

Figure 2A:
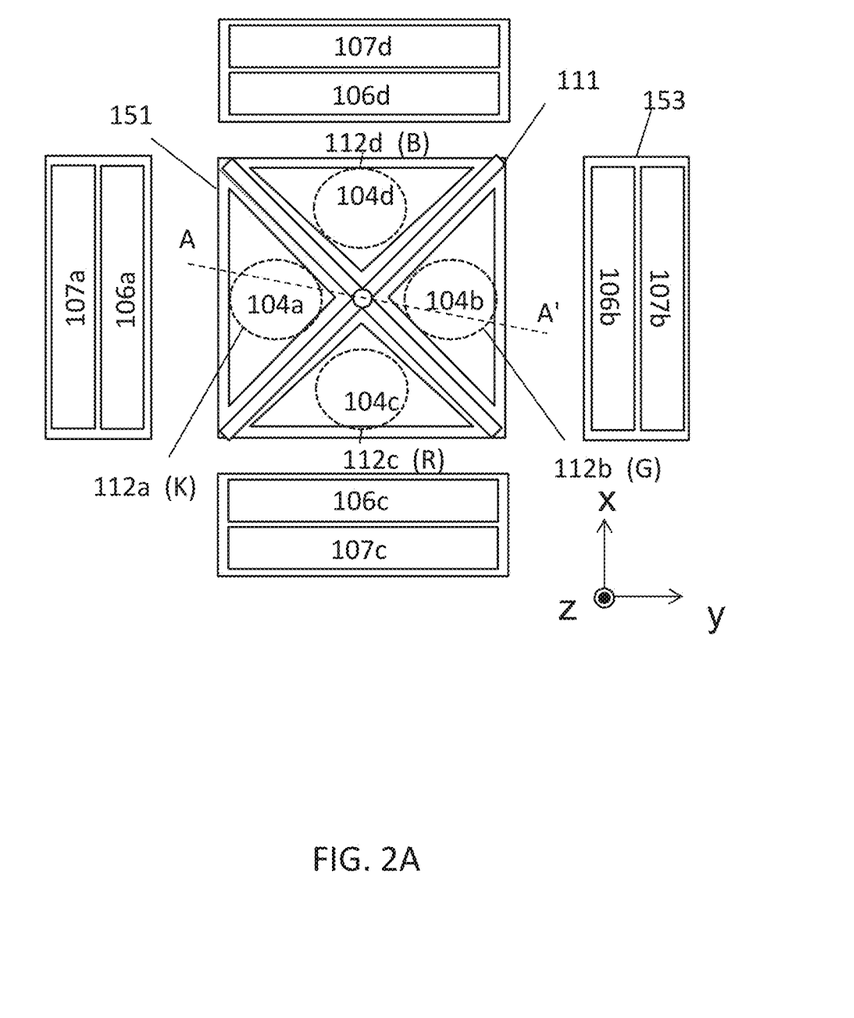
FIG. 2A is a development plan view illustrating a rear surface and a side surface of the reflective display device according to the first exemplary embodiment.

FIG. 2A is a plan view illustrating rear surface 151 viewed from display surface 152 side. Further, side surfaces 153 adjacent to rear surface 151 are shown developed in the same plane as rear surface 151. FIG. 1. Shows the cross-section taken along line A-A' in FIG. 2A. In FIG. 2A, cell 150 includes four side surfaces 153 and cell 150 has a rectangular shape. A size of interior space 155 of cell 150 may he designed according to applications of reflective display device 11. The example of of interior space 155 of cell 150 has 1 mm×1 mm×1 mm (x, y, and z directions in FIG. 1). Further, in a case a plurality of cells 150 are arranged (two-dimensionally in the x direction and the y direction in FIG. 1), a shape of display surface 152 may be triangular, quadrilateral, or hexagonal, such that no gap is produced between a plurality of cells 150. In this case, a number of the side surfaces varies depending on the shape of display surface 152. The reflective display device according to this exemplary embodiment is able to realize color display by 1 pixel. The color display used herein refers to an ability of displaying white, black, and at least one different color.

In this exemplary embodiment, cell 150 is constituted by display-side substrate 102, partition wall 103, and rear substrate 101. Display-side substrate 102 is made of a material transparent with respect to visible light such that light may enter cell 155 through display surface 152, and the light reflected on cell 155 may be emitted through display surface 152. Examples of the material include glass and resin. Partition wall 103 and rear substrate 101 are also made of glass, resin, or the like.

Referring to FIG. 1 and FIG. 2A, reflective display device 11 is provided with partition 111. Partition 111 is in a shape having radial extension, and is in contact with rear surface 151 and side surfaces 153. Partition 111 divides rear surface 151 into N regions. Here, N is an integer no smaller than 3, and N is 4 in this exemplary embodiment. In principle, there is no upper limit to N. However, when N increases, an amount of polar liquid provided in cell 155 in order to display the colors decreases. Practically, it is possible to perform color display with preferable brightness when N is around a number no smaller than 4 and no greater than 10.

Referring to FIG. 1 and FIG. 2A, the shape having radial extension is configured by lines connecting a center and four corners of a square. In other words, partition plates are radially arranged at intervals of 90° around the center. Height h of partition 111 is smaller than gap H between rear surface 151 and display surface 152. Gap H is height of the cell, and for example, H is 0.5 mm. With this, interior space 155 is divided into N portions 155b on rear surface 151 divided by partition 111 and portion 155a positioned above portions 155b and communicated with N portions 155b. Portion 155a faces an entire surface of display surface 152. Width of partition 111 is approximately 0.1 mm, for example.

Reflective display device 11 is provided with rear electrodes, display-side electrodes, first side electrodes, and second side electrodes, in order to cause polar liquid portions 112a-112d colored to respective display colors by electrowetting and non-polar fluid 113 to move between portions 155b and portion 155a within interior space 155 described above.

In the N regions of rear surface 151, N rear electrodes, specifically, rear electrodes 104a, 104b, 104c, and 104d are disposed. In this exemplary embodiment, rear electrodes 104a, 104b, 104c, and 104d are triangular. In the following description, rear electrodes 104a, 104b, 104c, and 104d are referred to as rear electrodes 104a-104d when specifying the four rear elect A first electrode and a second electrode are disposed on each of side surfaces 153 respectively in contact with the N regions of rear surface 151. Specifically, side surface 153 adjacent to the region provided with rear electrode 104a is provided with first side electrode 106a on a rear surface 151 side and second side electrode 107a on the display surface 152 side. Similarly, at a part of side surface 153 adjacent to the region provided with rear electrode 104b, first side electrode 106b on the rear surface 151 side and second side electrode 107b on the display surface 152 side are provided. Further, at a part of side surface 153 adjacent to the region provided with rear electrode 104c, first side electrode 106c on the rear surface 151 side and second side electrode 107c on the display surface 152 side are provided. Moreover, at a part of side surface 153 adjacent to the region provided with rear electrode 104d, first side electrode 106d on the rear surface 151 side and second side electrode 107d on the display surface 152 side are provided.

Figure 2B:
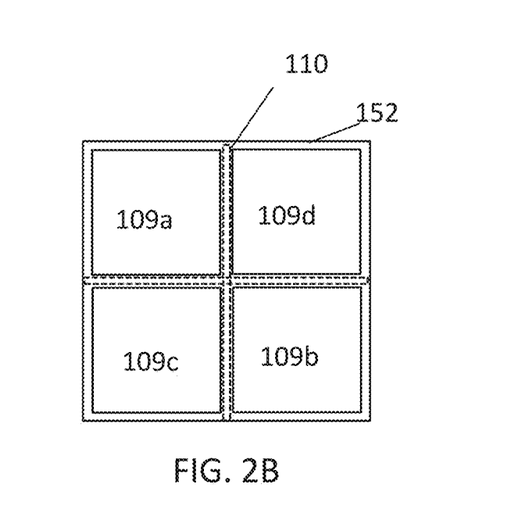
FIG. 2B is a plan view illustrating a display surface.

N display-side electrodes are disposed on display surface 152. Specifically, as illustrated in FIG. 2B, display surface 152 is separated by separator zone 110 in a shape having radial extension, and display-side electrodes 109a, 109b, 109c, and 109d are disposed in the separated regions, respectively. In order to facilitate understanding, FIG. 2B shows the display-side electrodes on display surface 152 when viewed above reflective display device 11. Separator zone 110 in the shape having radial extension divides display surface 152 in a square shape into four smaller squares. Display-side electrodes 109a, 109b, 109c, and 109d (hereinafter referred to as display-side electrodes 109a-109d) are transparent with respect to visible light. Width of separator zone 110 is approximately 0.1 mm, for example.

Figure 2C:
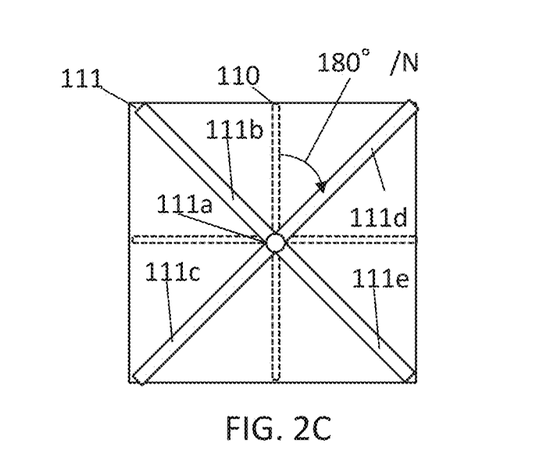
FIG. 2C shows a positional relation, between a separator zone and a partition.

FIG. 2C shows separator zone 110 in the shape having radial extension provided for display surface 152 and a positional relation with partition 111 in the shape having radial extension on the rear surface viewed from display surface 152. As illustrated in FIG. 2C, a center of separator zone 110 in the shape having radial extension and a center of partition 111 in the shape having radial extension on the rear surface substantially match with each other, and a direction of the radial extension of partition 111 is different from that of separator zone 110. More specifically, when viewed perpendicularly to display surface 152, the radial extension of partition 111 is rotated by 180°/N with respect to the radial extension of separator zone 110. In this exemplary embodiment, N is 4, and therefore the radial extension of partition 111 is rotated by 45° with respect to the radial extension of separator zone 110. A difference between the directions of the radial extension of partition 111 and the radial extension of separator zone 110 may not be 180°/N in a strict sense, and may be in a range of (180°/N)±5°, for example. With this, when the display-side electrodes and the rear electrodes are viewed from the display surface side, each of the rear electrodes overlaps with two of the display-side electrodes. Thus, when the polar liquid portion is moved from the rear surface 151 side to the display surface 152 side via side surfaces 153, the polar liquid portion is first allowed to be brought into contact with the two display-side electrodes on display surface 152, and therefore it is possible to reduce steps of spreading the polar liquid portion over an entire surface of display surface 152. As illustrated in FIG. 2C, partition 111 includes center 111a and a plurality of partition plates 111b-111e in a planar view, partition plates 111b-111e extend from center 111a toward outside of cell 110. Each of partition plates 111b-111e has a normal line that is parallel to display-side surface 102 or rear substrate 101. In other words, partition plates 111b-111e are perpendicular to display-side surface 102 or rear substrate 101.

Display-side electrodes 109a-109d are made of a transparent electrically-conducting material such as ITO or ZnO. It is sufficient that rear electrodes 104a-104d, first side electrodes 106a-106d, and second side electrodes 107a-107d have electron conductivity, and these electrodes may be made of a metallic material such as Cr, Pt, Au, Cu, or Al, or a conductive oxide such as ITO. As an influence given by rear electrodes 104a-104d, first side electrodes 106a-106d, and second side electrodes 107a-107d to colors to be displayed in reflective display device 11 is small, the material for these electrodes may be selected from various materials considering mechanical strength and conductivity of the electrodes.

Reflective display device 11 is further provided with dielectric layer 108 that covers the rear electrodes, the display-side electrodes, and the first and the second side electrodes. In this exemplary embodiment, dielectric layer 108 also covers a surface of partition 111. A surface of dielectric layer 108 is water repellent. For dielectric layer 108, a material having a low wetting property to the polar liquid portions colored to display colors, and a high wetting property to non-polar fluid is used. A compound containing fluorine in its chemical structure has low polarity as a material due to strong covalent bonding between carbon and fluorine, and wetting property to a polar solvent is low. At the same time, this compound has high chemical stability, and may be advantageously utilized as dielectric layer 108.

By applying a voltage to the electrodes, interface energy between solid substances in contact with polar liquid portions 112a-112d decreases by an amount of electrostatic energy of capacitors provided between the electrodes and respective polar liquid portions 112a-112d, and a contact angle between polar liquid portions 112a-112d and dielectric layer 108 is reduced. This is known as electrowetting. With this, apparently, a wetting property of the surface of dielectric layer 108 changes, and wetting properties to polar liquid portions 112a-112d increase at portions to which the voltage has been applied.

In view of the above, the movement of polar liquid portions 112a-112d based on electrowetting is more advantageous as an electrostatic capacitance of dielectric layer 108 is larger. Accordingly, the material or thickness of dielectric layer 108 may be selected or designed so that the electrostatic capacitance increases, such as forming dielectric layer 108 using a material having high relative permittivity, or reducing the thickness of a film. As adhesiveness of a fluorine-based compound with a substrate is poor in general, dielectric layer 108 may be configured as a stacked body in order to improve this point. For example, dielectric layer 108 may be configured by providing a layer including various inorganic compounds at the interface with the substrate and then providing a resin layer containing fluorine above this layer, in order to improve adhesiveness between the substrate and the electrodes and to increase the relative permittivity of an entire dielectric film. In this exemplary embodiment, water repellent film 114 made of Teflon (registered trademark) AF is provided over dielectric layer 108 made of silicon dioxide.

In interior space 155 of cell 150, polar liquid portions 112a-112d and non-polar fluid 113 are arranged. For polar liquid portion 112a-112d and for non-polar fluid 113, the materials that are not mixed with each other are selected materials.

Polar liquid portions 112a-112d are partitioned by partition 111, respectively disposed within four portions in the interior space in which rear electrodes 104a-104d are positioned. Polar liquid portions 112a-112d are respectively colored to four different colors. For example, polar liquid portions 112a-112d respectively represent black (K), green (G), red (R), and blue (B). Amounts of polar liquid portions 112a-112d are selected within a range that is equal to or smaller than the respective portions in interior space 155 divided by partition 111, and that an entirety of display surface 152 may be covered.

Examples of polar liquid portions 112a-112d include liquid having high polarity such as water, amide, glycol, polyalcohol, amino alcohol, or glycerin. Further, organic ambient temperature molten salt called ionic liquid may be used as polar liquid portions 112a-112d, since the ionic liquid is a polar solvent and its vapor pressure is small and susceptible to evaporation. In order to display the above described colors, polar liquid portions 112a-112d contain colorant or pigment dissolved therein, corresponding to the colors to be displayed. A number of the colorant or pigment is not limited to one kind, and two or more kinds of colorant or pigment may be dissolved in polar liquid portions 112a-112d.

Non-polar fluid 113 is liquid, for example. As the liquid, oil that is carbon tetrachloride based or hydrocarbon based may be used. In its chemical structure, silicone oil has low polarity and low solubility parameters to many kind of liquid, and thus may be used in this exemplary embodiment in various combinations with polar liquid portions 112a-112d. Here, non-polar fluid 113 is colored to white.

Reflective display device 11 may be manufactured using manufacturing techniques for liquid crystal display apparatuses and semiconductor devices.

For example, partition wall 103 and partition 111 are first provided on rear substrate 101 using a method such as screen printing. Alternatively, partition wall 103, partition 111, and interior space 155 may be provided by etching rear substrate 101 using a method such as sandblasting. Then, rear electrodes 104a-104d, first side electrodes 106a-106d, and second side electrodes 107a-107d are provided on rear substrate 101 and partition wall 103 using a semiconductor manufacturing technology. Thereafter, dielectric layer 108 and water repellent film 114 are provided so as to cover these electrodes.

Further, display-side electrodes 109a-109d are provided on display-side substrate 102. Then, dielectric layer 108 and water repellent film 114 are provided so as to cover display-side electrodes 109a-109d using a technique such as thin-film formation or application.

Thereafter, polar liquid portions 112a-112d and non-polar fluid 113 are filled into interior space 155, and display-side substrate 102 is joined with partition wall 103, and thus reflective display device 11 is completed. While lines for applying a voltage to the electrodes are not shown in FIG. 1, such lines may also be provided when providing the electrodes described above.

Next, an operation of reflective display device 11 will be described with reference to FIG. 1 through FIG. 4. Further, Table 1 shows a state of an electrode to which a voltage is applied and a corresponding polar liquid portion. In the following description, an example in which polar liquid portion 112a (black) positioned above rear electrode 104a is moved to display black will be described. Other colors may also be displayed by applying voltages to the corresponding electrodes.

When a voltage is not applied to any of the electrodes, as illustrated in FIG. 1, non-polar fluid 113 is positioned on the display surface 152 side and polar liquid portions 112a-112d are positioned on the rear surface 151 side. Therefore, light that enters display surface 152 from outside is emitted from display surface 152 after diffused reflection within non-polar fluid 113. Thus, reflective display device 11 displays white.

TABLE 1

Figure 3A:
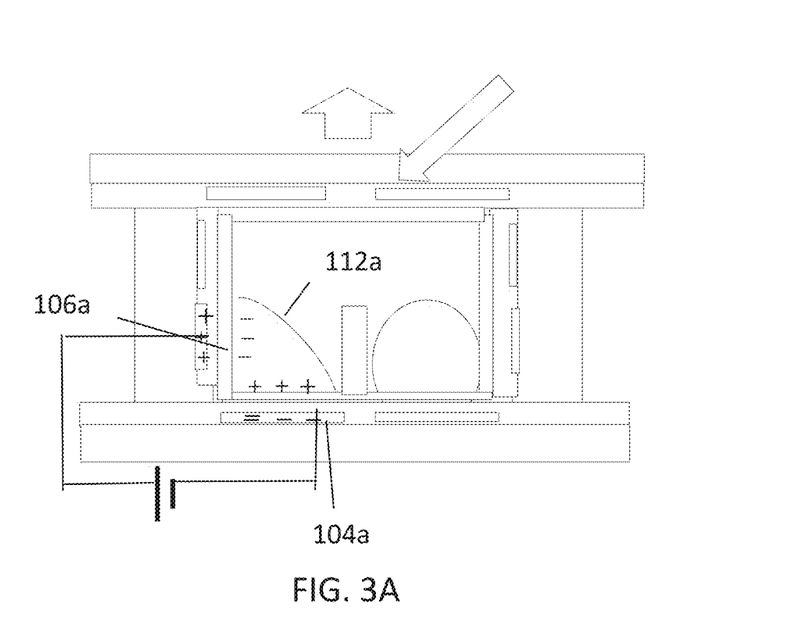
FIG. 3A illustrates an operation of the reflective display device according to the first exemplary embodiment.
Figure 3B:
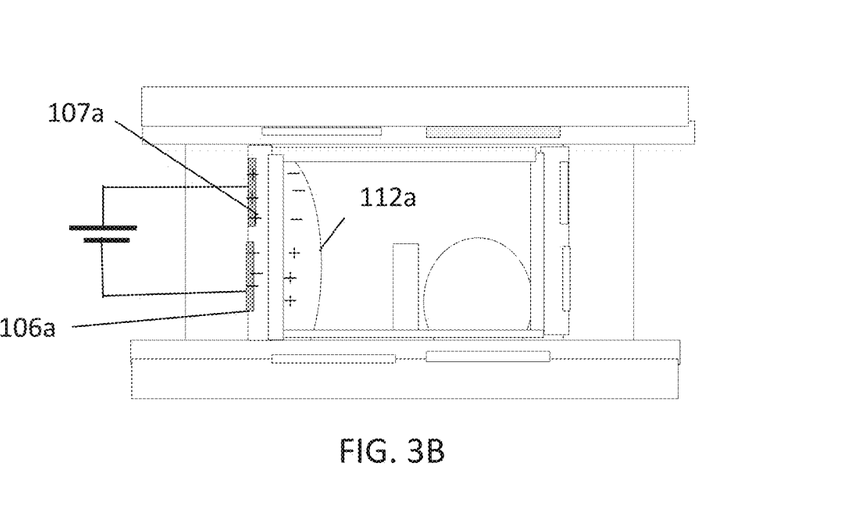
FIG. 3B illustrates the operation of the reflective display device according to the first exemplary embodiment.
Figure 4A:
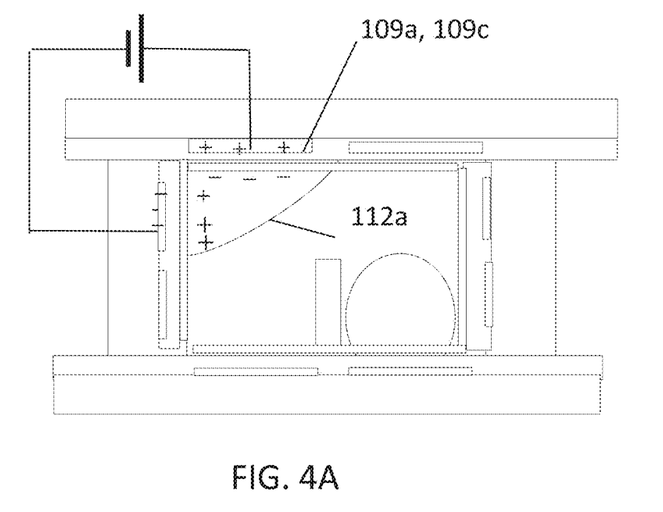
FIG. 4A illustrates the different operation of the reflective display device according to the first exemplary embodiment.
Figure 4B:
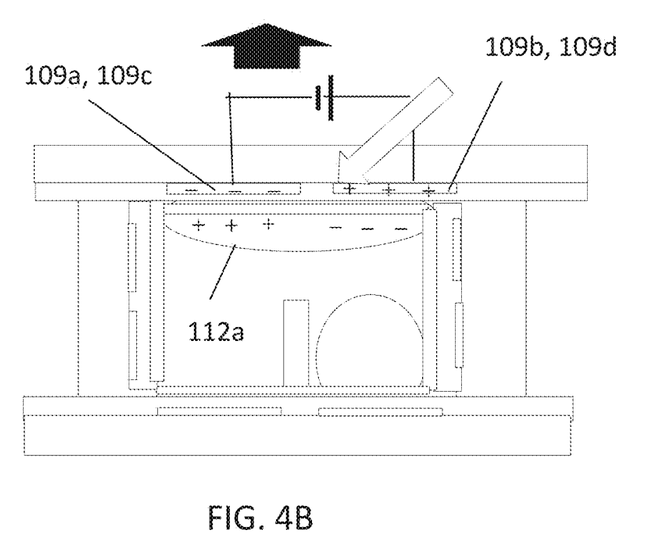
FIG. 4B illustrates the different operation of the reflective display device according to the first exemplary embodiment.

| | Electrode to be applied voltage | |
| --- | --- | --- |
| | Voltage (volts) | Voltage (standard) |
| FIG. 3A | 106a | 104a |
| FIG. 3B | 107a | 106a |
| FIG. 4A | 109a, 109c | 107a |
| FIG. 4B | 109b, 109d | 109a, 109c |

As illustrated in FIG. 3A, for example, when positive voltage V is applied to first side electrode 106a and a reference voltage is applied to rear electrode 104a, a negative charge is induced at a position facing a position at which a positive charge produced at rear electrode 104a and a positive charge is induced at a position facing a position at which a negative charge produced at first side electrode 106a within polar liquid portion 112a. Accordingly, polar liquid portion 112a is disposed symmetrically across rear electrode 104a and first side electrode 106a such that electrostatic energy due to the two capacitors is minimized and stabilized.

Next, as shown in FIG. 3B, voltage V is applied to second side electrode 107a, and a reference voltage is applied to first side electrode 106a. With this, the charges within inks are also redistributed according to a voltage change at the electrodes, polar liquid portion 112a moves to a position so as to be disposed across first side electrode 106a and second side electrode 107a as an energetically stable position.

Further, as illustrated in FIG. 4A, when voltage V is applied to display-side electrodes 109a and 109c and a reference voltage is applied to second side electrode 107a, polar liquid portion 112a moves to the display surface 152 side, and polar liquid portion 112a moves to a position so as to be disposed across display-side electrodes 109a and 109c and second side electrode 107a.

Moreover, as illustrated in FIG. 4B, when voltage V is applied to display-side electrodes 109b and 109d and a reference voltage is applied to display-side electrodes 109b and 109d, polar liquid portion 112a moves to the display surface 152 side, and polar liquid portion 112a moves to a position so as to be disposed across display-side electrodes 109a-109d and second side electrode 107a. With this, polar liquid portion 112a moves to the display surface 152 side, and reflective display device 11 is able to display black.

In order to resume white display from black display, it is possible to move polar liquid portion 112a back to the position at which rear electrode 104a is positioned by applying voltages to the electrodes in an inversed order of the order described above. In particular, when a volume of the polar liquid is reduced down to several microliters or smaller, an influence of a gravity force reduces and a change in Coulomb's force due to charges is dominant. Accordingly, it is possible to realize movement of the polar liquid on side surfaces 153 and on display surface 152 that is similar to the movement on a normal plane.

As described above, the rest of polar liquid portions 112b-112d may also be moved to the display surface 152 side by applying voltages to the corresponding electrodes in the order described above.

As described bed above, according to this exemplary embodiment, each of the plurality of colored polar liquid portions may be disposed over an entire display surface. Accordingly, when the polar liquid portions of red, blue, green, and black are prepared, for example, it is possible to display red, blue, green, black, and white with reflectance close to 100%.

Further, a state in which a polar liquid portion is positioned on the display surface side and a color of this polar liquid portions is displayed, and a state in which non-polar fluid is positioned on the display surface side and white is displayed are a bistable state, and a capacitance due to a charge pair between the electrodes and the polar liquid portions may be maintained even if application of the voltage is stopped. Accordingly, it is possible to maintain display of the color in the corresponding state.

Moreover, according to this exemplary embodiment, the radial extension of partition 111 is rotated by 180°/N with respect to the radial extension of separator zone 110. Accordingly, when the polar liquid portion is moved from the rear surface side to the display surface side via the side surface, the polar liquid portion is first allowed to be brought into contact with the two display-side electrodes on the display surface. With this, it is possible to display the color stably with a reduced number of steps. By contrast, when the display-side electrodes are arranged in the same pattern as rear electrodes 104a-104b, it may possibly become difficult to move the polar liquid portion reliably in the above described steps. For example, when the display-side electrodes are provided as display-side electrodes 104a'-104d' that are arranged in the same pattern as rear electrodes 104a-104b, in a state corresponding to the state illustrated in FIG. 4A in the above steps, a voltage is applied to only display-side electrode 104a' among the display-side electrodes. As a charge within the polar liquid portion induced by application of a voltage to the electrode controls a position of the polar liquid portion, it is difficult to reliably spread the polar liquid portion disposed symmetrically across display-side electrode 104a' and second side electrode 107a over an entire surface of display surface 152 only by a voltage applied next. Further in order to move the polar liquid portion reliably, it is then necessary to apply a voltage between display-side electrode 104a' and display-side electrode 104d' (or 104c'), and to finally apply a voltage between display-side electrodes 104a' and 104d' and display-side electrode 104c' and 104b'. In other words, the number of steps for applying voltages increases.

Second Exemplary Embodiment

A reflective display device according to this exemplary embodiment is different from the reflective display device of the first exemplary embodiment in that the number N of the interior spaces divided by the partition is 8.

A cross-sectional structure of the reflective display device according to this exemplary embodiment is the same as that illustrated in FIG. 1, and therefore differences in the structure will be mainly described.

Figure 5A:
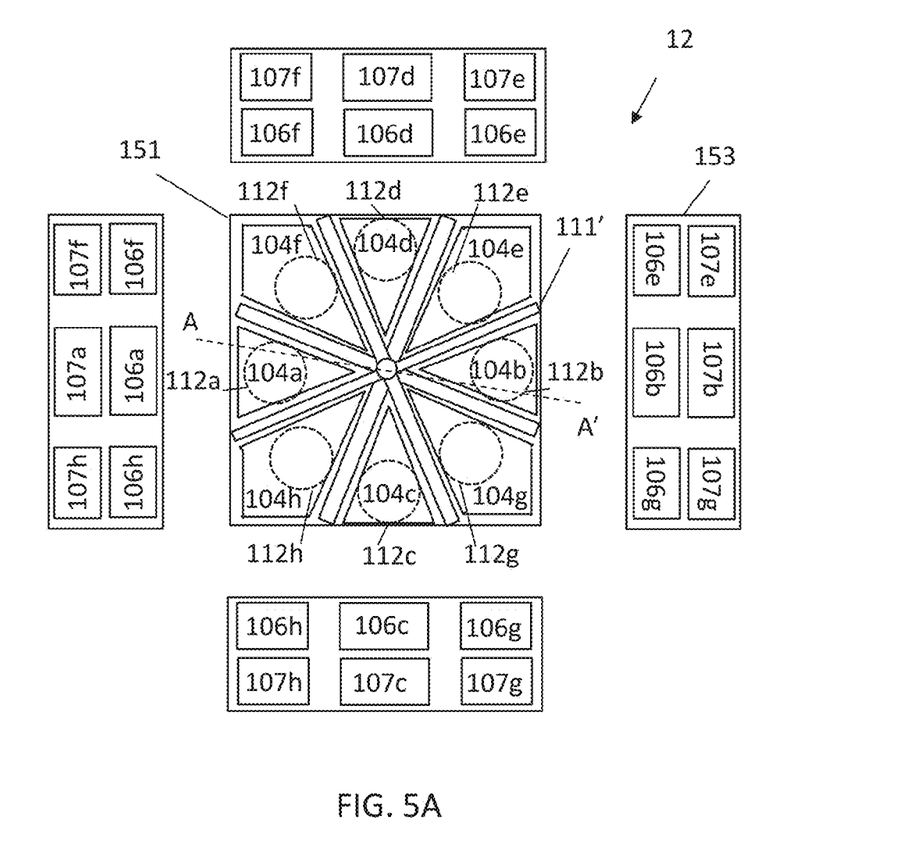
FIG. 5A is a development plan view illustrating a rear surface and a side surface of a reflective display device according to a second exemplary embodiment.

FIG. 5A is a plan view of rear surface 151 viewed from the display surface 152 side of reflective display device 12. Further, side surfaces 153 adjacent to rear surface 151 are shown developed in the same plane as rear surface 151. The cross-section taken along line A-A' in FIG. 5A corresponds to FIG. 1. Partition 111' is in a shape having radial extension, and divides rear surface 151 into 8 regions. Rear electrodes 104a-104h are disposed in the respective regions.

In this exemplary embodiment, non-polar fluid 113 may be white or transparent. Further, non-polar fluid 113 may be a gaseous body.

Polar liquid portions 112a-112h are arranged on rear electrodes 104a-104h. Polar liquid portions 112a-112h are respectively colored to different colors. For example, polar liquid portion 112a is colored to black (K), polar liquid portion 112b is colored to green (G), polar liquid portion 112c is colored to red (R), and polar liquid portion 112d is colored to blue (B). Further, polar liquid portion 112e is colored to cyan (C), polar liquid portion 112f is colored to magenta (M), polar liquid portion 112g is colored to yellow (Y), and polar liquid 121h is colored to white (W).

Figure 5B:
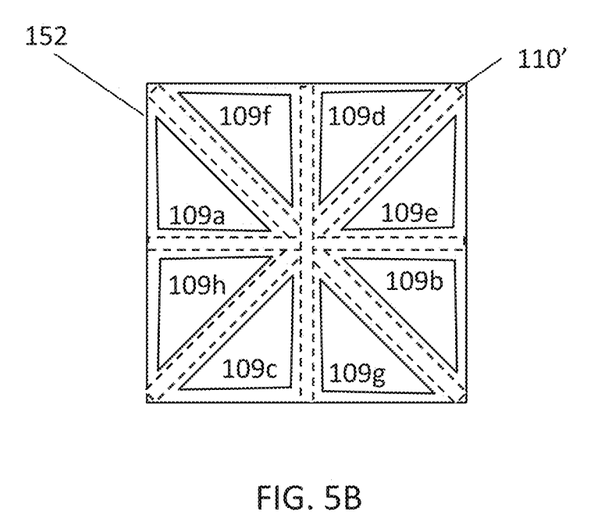
FIG. 5B is a plan view illustrating a display surface.

FIG. 5B shows display-side electrodes 109a-109h disposed on display surface 152. Display surface 152 is separated by separator zone 110' in a shape having radial extension, and display-side electrodes 109a-109h are disposed in the separated regions, respectively.

Similarly to the first exemplary embodiment, as illustrated in FIG. 5(c), a center of separator zone 110' in the shape having radial extension and a center of partition 111' in the shape having radial extension on the rear surface substantially match with each other, and a direction of the radial extension of partition 111' is different from that of separator zone 110. More specifically, the radial extension of partition 111' is rotated by 180°/N=22.5° with respect to the radial extension of separator zone 110'.

Referring to FIG. 5A, first side electrodes 106a, 106f, and 106f, and second side electrodes 107a, 107f, and 107f are disposed on left side surface 153. First side electrodes 106b, 106e, and 106g, and second side electrodes 107b, 107e, and 107g are disposed on right side surface 153. Further, first side electrodes 106d, 106f, and 106e, and second side electrodes 107d, 107f, and. 107e are disposed on upper side surface 153. First side electrodes 106c, 106h, and 106g, and second side electrodes 107c, 107h, and 107g are disposed on lower side surface 153. The first side electrodes and second side electrodes 107 that are provided side by side for adjacent side surfaces 153 are denoted by the same reference numerals. For example, first side electrode 106f of upper side surface 153 is disposed adjacent to first side electrode 106f of left side surface 153. The two side electrodes provided side by side for adjacent side surfaces 153 may be electrically connected with or separated from each other. Further, these two side electrodes may be provided monolithically. The same voltage is applied to these two side electrodes provided side by side for adjacent side surfaces 153 when the polar liquid portions are moved.

Reflective display device 12 operates in the same manner as reflective display device 11 in the first exemplary embodiment. When a voltage is not applied to the electrodes, all of polar liquid portions 112a-112h are positioned on the rear surface side, and the color of non-polar fluid 113 filled in the ink is displayed. Further, when non-polar fluid 113 is transparent, gray is displayed, which is a color resulted from color mixing of the 8 colors (RGBCMYWK).

Next, an operation of reflective display device 12 will he described with reference to FIG. 3, FIG. 4, and FIG. 5, taking the example of movement of black polar liquid portion 112a as in the first exemplary embodiment. Table 2 shows a state of an electrode to which a voltage is applied and a corresponding polar liquid portion.

TABLE 2

|  | Electrode to be applied voltage | |
| --- | --- | --- |
|  | Voltage (volts) | Voltage (standard) |
| FIG. 3A | 106a | 104a |
| FIG. 3B | 107a | 106a |
| FIG. 4A | 109a, 109h | 107a |
| FIG. 4B | 109d, 109e | 109f, 109a |
|  | 109b, 109g | 109h, 109c |

As illustrated in FIG. 3A, for example, when positive voltage V is applied to first side electrodes 106a and a reference voltage is applied to rear electrodes 104a, polar liquid portion 112a is disposed symmetrically across rear electrode 104a and first side electrode 106a.

Next, as shown in FIG. 3B, voltage V is applied to second side electrode 107a, and a reference voltage is applied to first side electrode 106a. With this, the charges within inks are also redistributed according to a voltage change at the electrodes, polar liquid portion 112a moves to a position so as to be disposed across first side electrode 106a and second side electrode 107a as an energetically stable position.

Further, as illustrated in FIG. 4A, when voltage V is applied, to display-side electrodes 109a and 109h and a reference voltage is applied to second side electrode 107a, polar liquid portion 112a moves to the display surface 152 side, and polar liquid portion 112a moves to a position so as to be disposed across display-side electrodes 109a and 109h and second side electrode 107a.

Moreover, as illustrated in FIG, 4B, when voltage V is applied to display-side electrodes 109d, 109e, 109b, and 109g and a reference voltage is applied to display-side electrodes 109f, 109a, 109h, and 109c, polar liquid portion 112a moves to the display surface 152 side, and polar liquid portion 112a moves to a position so as to be disposed across display-side electrodes 109d, 109e, 109b, and 109g and display-side electrodes 109f, 109a, 109h, and 109c. With this, polar liquid portion 112a moves to the display surface 152 side, and reflective display device 12 is able to display black.

In order to resume white display from black display, it is possible to move polar liquid portion 112a back to the position at which rear electrode 104a is positioned by applying voltages to the electrodes in an inversed order of the order described above. In the same manner, green polar liquid portion 112b, red polar liquid portion 112c, and blue polar liquid portion 112d may also be moved to the display surface 152 side to display green, red, or blue over an entire surface of display surface 152.

As described above, the same voltage is applied to the two first side electrodes or the two second side electrodes having the same reference numeral when polar liquid portions 112e, 112f, 112g, and 112h at rear electrodes 104e, 104f, 104g, and 104h are moved.

For example, when magenta polar liquid portion 112f is moved, polar liquid portion 112f may be moved to the display surface 152 side by applying a voltage in order as shown in Table 3, and magenta may be displayed over an entire surface of display surface 152.

TABLE 3

|  | Electrode to be applied voltage | |
| --- | --- | --- |
|  | Voltage (volts) | Voltage (standard) |
| FIG. 3A | 106f (two) | 104a |
| FIG. 3B | 107f (two) | 106f (two) |
| FIG. 4A | 109a, 109f | 107f (two) |
| FIG. 4B | 109e, 109b | 109f, 109a |
|  | 109g, 109c | 109h, 109d |

According to the reflective display device of this exemplary embodiment, 8 colors of R, G, C, M, Y, W, and K, and gray, in addition, may be displayed, and it is possible to display each of the colors with reflectance close to 100%. Thus, it. is possible to set a color solid having a large volume representing color reproducibility, and to realize high color reproducibility. Further, it is possible to achieve sufficiently high reflectance even when the number of the colors for the polar liquid portions is reduced.

Third Exemplary Embodiment

Figure 6A:
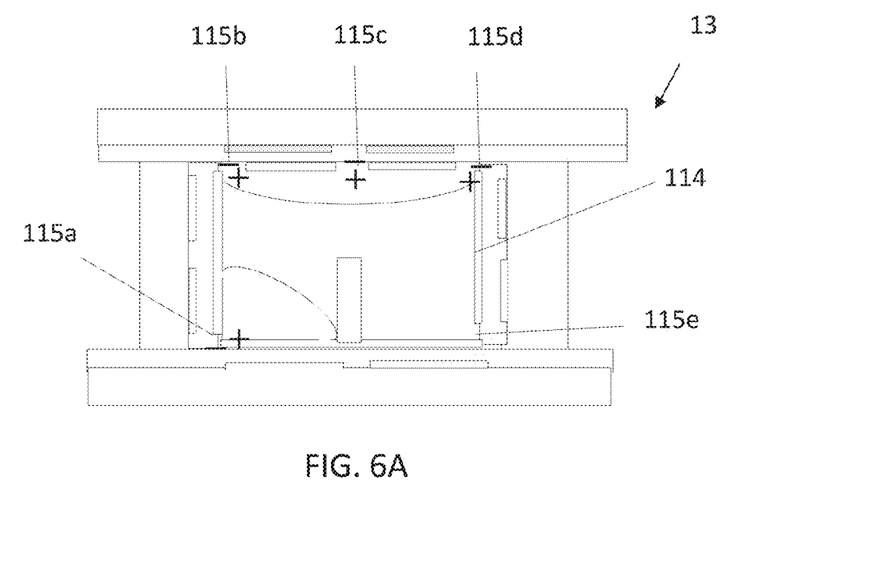
FIG. 6A shows a cross-section structure of a reflective display device according to a third exemplary embodiment.

FIG. 6A shows a cross-section structure of reflective display device 13 of this exemplary embodiment. Reflective display device 13 has higher wetting properties or hydrophilic properties in regions 115b, 115c, and 115d around the display-side electrodes, and regions 115a and 115e around the rear electrodes on a front surface of the dielectric layer. With this, even when an electrostatic attractive force due to charges between the electrodes and the polar liquid, portions is lost due to a voltage not being applied for an extended period of time, it is possible to maintain a state in which the polar liquid portions are positioned on the rear surface side or a state in which the polar liquid, portions are positioned on the display surface side by a chemical affinity between hydrophilic regions and the polar liquid portions.

Figure 6B:
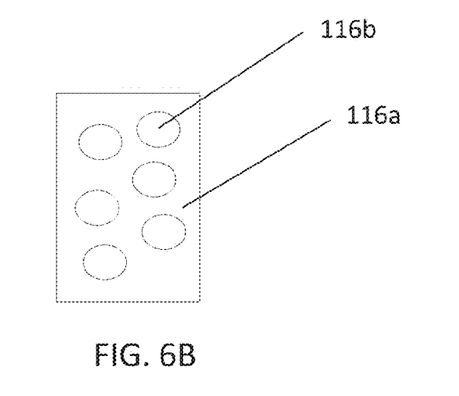
FIG. 6B shows a structure of a water repellent film.
Figure 6C:
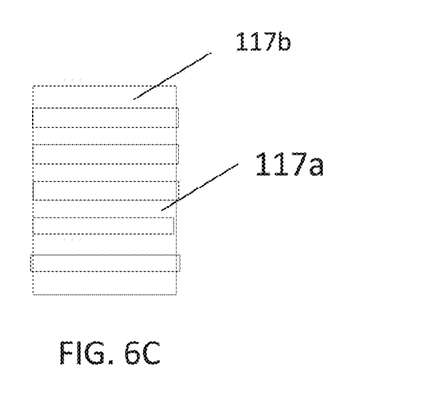
FIG. 6C shows a structure of a water repellent film.

As illustrated in FIG. 6B, the hydrophilic regions may he provided, for example, such that non-formation regions 116b are provided at portions of a front surface of water repellent film 116a provided over a front surface of a hydrophilic dielectric layer. Further, as illustrated in FIG. 6C, water repellent film 117a in stripes may be provided on front surface 117b of the dielectric layer. In either case, long-term stability of display increases if an area ratio of the hydrophilic regions with respect to the water repellent is larger. However, this increases a voltage to be applied to move the polar liquid portion.

When a still image is displayed in a display apparatus configured by the reflective display device, as a time period in which the still image is displayed is long, power consumed by the display apparatus in the operation does not increase much even if a driving voltage somewhat increases. Further, by appropriately determining the area ratio of the hydrophilic region with respect to the water repellent region, it is possible to improve long-term stability when displaying a still image and to reduce a voltage when displaying a moving image.

Fourth Exemplary Embodiment

Figure 7A:
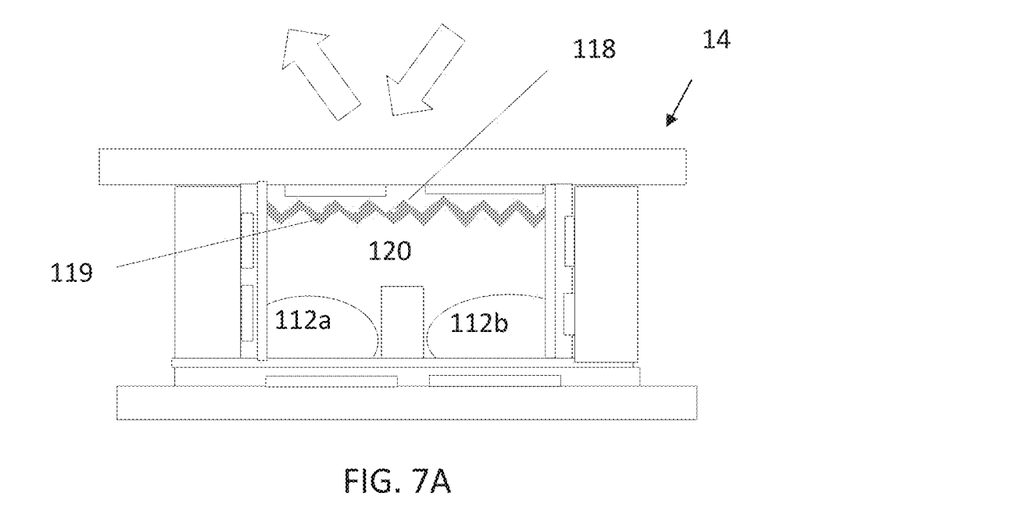
FIG. 7A shows a cross-section structure and a principle of display of the reflective display device according to the fourth exemplary embodiment.

FIG. 7A shows a cross-section structure of reflective display device 14 according to this exemplary embodiment. Reflective display device 14 is different form reflective display device 11 of the first exemplary embodiment in that cloudy body 118 is provided over the display-side electrodes. Cloudy body 118 is in a shape having random bumps of a size approximately from 1 μm to 20 μm. The bumps of this size cause entered light to be scattered by Mie scattering. Cloudy body 118 may be provided, for example, by imprinting glass or curing droplets of inks in dots. When monolithically provided over the display-side electrodes, cloudy body 118 may also be provided by sol-gel processing or electro-deposition of wide-gap semiconductor such as ZnO.

Figure 7B:
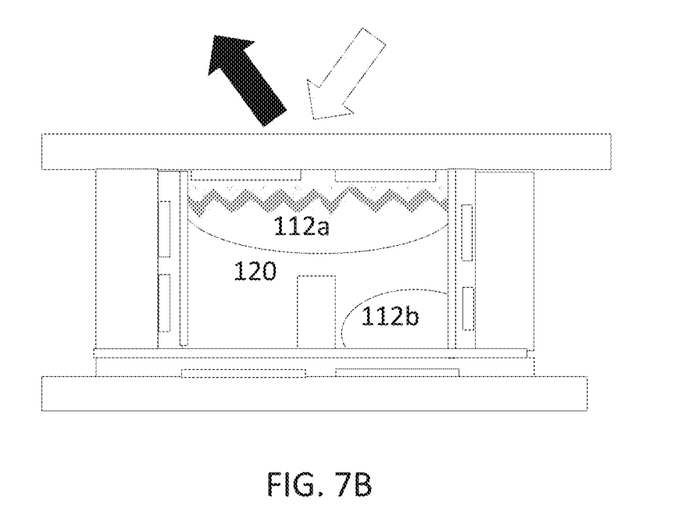
FIG. 7B shows a cross-section structure and a principle of display of a reflective display device according to a fourth exemplary embodiment.

Over cloudy body 118, water repellent film 119 is provided, which is in contact with air 120. In this exemplary embodiment, a gaseous body is used as non-polar fluid 113. White light that enters display surface 152 is subjected to total reflection on cloudy body 118 by Mie scattering, and is reflected with high reflectance over 50%. FIG. 7B shows a state in which black polar liquid. portion 112a is moved according to the steps described in the first exemplary embodiment to be disposed on the front surface side. By bringing polar liquid portion 112a into contact with cloudy body 118, the entered light does not totally reflect on a front surface of cloudy body 118 and is transmitted to polar liquid portion 112a. Then, polar liquid portion 112a absorbs the entered light. With this, reflective display device 14 displays black. This effect is large when a difference between a refractive index of polar liquid portion 112a and a refractive index of the cloudy body is small. For example, when the cloudy body is glass and polar liquid portion 112a is water-based, a contrast W/K may be around 10:1. Further, when the cloudy body is configured by wide-gap semiconductor (refractive index>2), reflecting brightness of 70% or above in contact with air may be obtained. By using polar liquid portion 112a having a high refractive index close to this value, it is possible to realize a reflective display device with high reflectance and high contrast.

Moreover, according to this exemplary embodiment, it is possible to perform color display without using oil, as the non-polar fluid. Therefore, it is possible to reduce long-term color degradation, as color elements such as colorant or pigment may not move each other via the oil. Thus, it is possible to realize a highly reliable reflective display device having a simpler configuration.

It should be appreciated that the shape of the cell is quadrilateral when viewed, from the display surface side in the first exemplary embodiment to the fourth exemplary embodiment, but may be in another shape. Alternatively, the patterns of the display-side electrodes and the rear electrodes may be opposite.

The reflective display device disclosed in the present disclosure may be suitably used for various types of display apparatuses, and useful for color electronic paper such as electronic magazines and electronic books. In addition, the reflective display device disclosed, in the present disclosure may be applicable to large-sized signage such as electronic advertising display and electronic mural painting.

What is claimed is:
1. A reflective display device comprising:
   a cell having:
      a display surface;
      a rear surface facing the display surface;
      side surfaces positioned between the display surface and the rear surface; and
      an interior space defined by the display surface, the rear surface, and the side surfaces;
   a partition in contact with the rear surface and the side surfaces, the partition having height smaller than a gap between the display surface and the rear surface and being in a shape having radial extension dividing the rear surface into N regions;
   a rear electrode respectively provided, for the N regions on the rear surface;
   a first side electrode disposed on a display surface side and a second side electrode disposed on a rear surface side, both the first side electrode and the second side electrode being provided for each of N regions of the side surfaces respectively adjacent to the N regions of the rear surface;
   N display-side electrodes transparent to visible light, the display-side electrodes being disposed on the display surface and separated by a separator zone in a shape having radial extension;
   a dielectric layer covering the N rear electrodes, the N display-side electrodes, and the first side electrode and the second side electrode in each of the N regions of the side surfaces;

polar liquid portions of N colors respectively disposed in N portions in the interior space divided by the partition; and polarity fluid placed within the interior space, wherein when viewed from the display surface side, a center of the partition. in the shape having the radial extension and a center of the separator zone in the shape having the radial extension match with each other, and a direction of the radial extension of the partition is different from a direction of the radial extension of the separator zone.

2. The reflective display device according to claim 1, wherein when viewed along a direction perpendicular to the display surface, the partition is rotated by 180°/N with respect to the separator zone.

3. The reflective display device according to claim 1, wherein the N is 4 or 8.

4. The reflective display device according to claim 1, wherein on a front surface of the dielectric layer, regions around the rear electrodes and around the display-side electrodes have higher wetting properties as compared to other regions.

5. The reflective display device according to claim wherein a front surface of each of the display-side electrodes is provided with bumps of a size of not less than 1 μm and not more than 20 μm.

* * * * *